Patented Jan. 29, 1929.

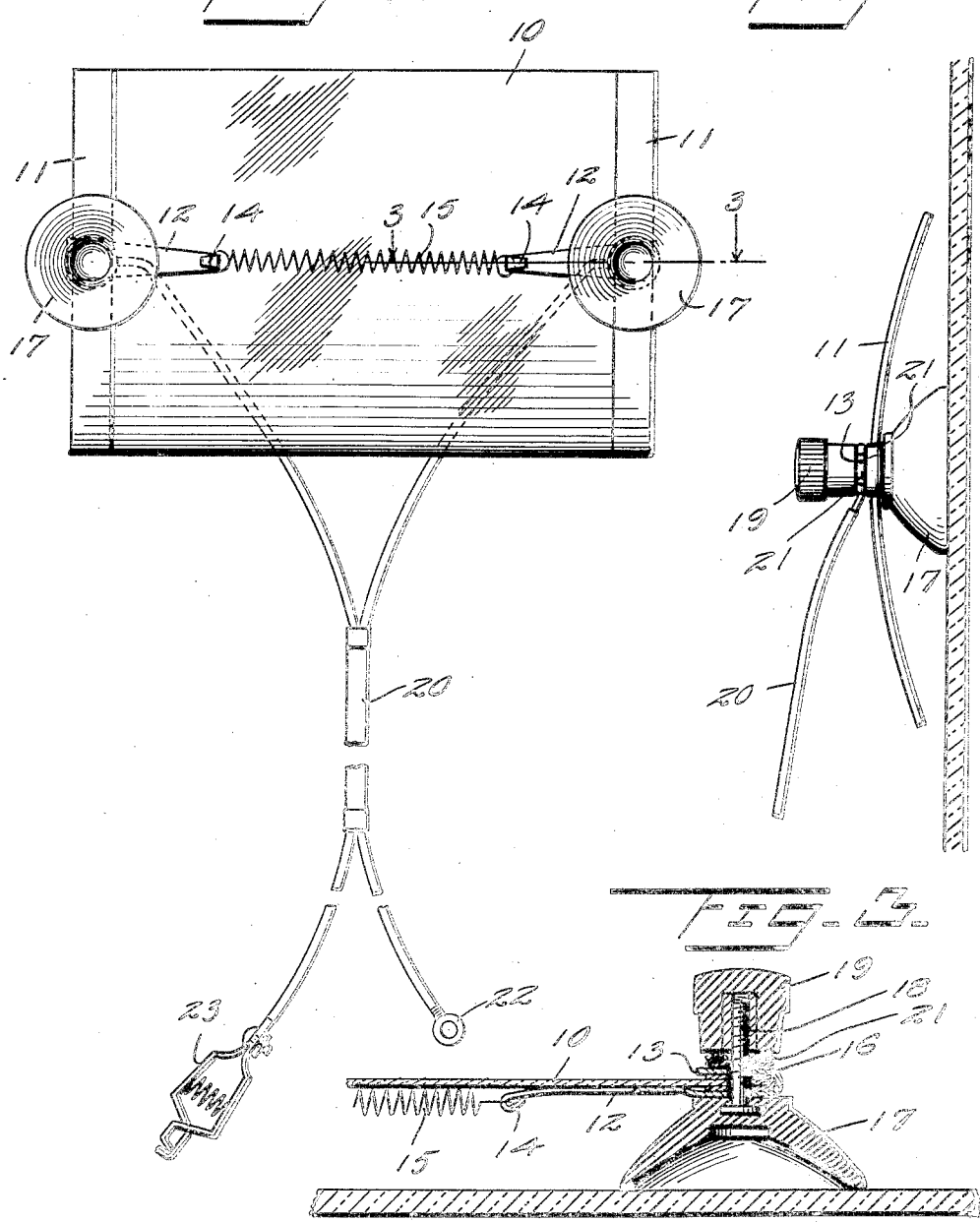

1,700,544

UNITED STATES PATENT OFFICE.

WILLIAM A. RUKA AND ALFRED F. HEINEMANN, OF PHILLIPS, WISCONSIN.

HEATER FOR WINDSHIELDS.

Application filed February 2, 1928. Serial No. 251,408.

This invention relates to heaters for windshields and has for an important object thereof the provision of a combined windshield heater and glare shield, whereby a section of the windshield will at all times be kept from a deposit of frost or ice and this same section shielded from the glare of headlights of oncoming vehicles.

A further object of the invention is the provision of a construction of this character which may be not only cheaply and readily manufactured, but may be readily attached to and removed from the vehicle without the assistance of a mechanic and without the use of any tools other than those ordinarily provided in the kit of an automobile.

These and other objects we attain by the construction shown in the accompanying drawings, wherein for the purpose of illustration is shown a preferred embodiment of our invention and wherein:—

Figure 1 is a rear elevation of a windshield heater constructed in accordance with our invention;

Figure 2 is a side elevation thereof showing the device applied to the windshield;

Figure 3 is a section on the line 3—3 of Figure 1.

Referring now more particularly to the drawings, the numeral 10 generally designates a mica or other suitable translucent sheet, which is arcuately curved and of a desired length. The ends of this sheet are bound by metallic clips 11 to retain the curved formation. 12 designates a copper or other suitable conducting strip of which one is disposed at each end of the sheet and has one end reverted about the binding 11 thereof, as indicated at 13. The opposite end of each strip is bent to form a hook 14 receiving one end of a coiled resistance wire 15, so that this resistance wire is supported adjacent to the sheet at the center thereof.

Through the strip 12, its revert and the engaged bindings, openings 16 are formed. Rubber vacuum cups 17 are provided which have embedded therein, in the process of manufacture, screws 18 which are adapted to pass through the openings 16 and receive binding nuts 19. A double wire connection cord 20 is provided, corresponding ends of which are provided with terminal eyes 21 to engage the screws 18 and be held thereon by the binding nuts. The opposite ends of these wires are provided one with an eye 22 permitting its engagement with a hot wire of the electrical system of the automobile and the other with a clip 23 permitting it to be engaged with some metallic portion of the vehicle to complete the circuit. In this connection, it is pointed out that the electrical circuits of automobiles are usually completed through the frame thereof, so that engagement of the clip with any metallic portion of the frame will complete the circuit.

It will be obvious that a device of this character may be very readily and cheaply constructed and is very readily attached to the vehicle. It will also be obvious that the construction hereinbefore set forth is capable of a certain range of change and modification without materially departing from the spirit of the invention and we accordingly do not limit ourselves to such specific structure except as hereinafter claimed.

We claim:—

1. A windshield heater comprising a translucent sheet having bindings at its end maintaining the sheet in arcuately curved formation, conducting strips each having one end reverted upon an end of the sheet and at its opposite end means for securing thereto one end of a resistance wire, lead wires for connection with said conducting strips, vacuum cups for attaching the sheet to a windshield with the concave face thereof disposed toward the windshield and common securing elements connecting the vacuum cups and conducting strips to the sheet and the lead wires to the conducting strips.

2. A windshield heater comprising a transverse concavely curved translucent sheet, conducting strips each having one end thereof reverted upon an end of the sheet and its opposite end provided with a hook, a resistance wire connecting the last named ends of the strips, and means for connecting the conducting strips to the sheet providing a means for connecting to the conducting strips lead wires from a source of current.

3. A windshield heater comprising a transverse concavely curved translucent sheet, conducting strips each having one end thereof reverted upon an end of the sheet and its opposite end provided with a hook, a resistance wire connecting the last named ends of the strips, vacuum cups for attaching the sheet to a windshield and common securing elements securing the vacuum cups and conducting strips to the sheet.

4. A windshield heater comprising a transverse concavely curved translucent sheet, conducting strips each having one end thereof reverted upon an end of the sheet and its opposite end provided with a hook, a resistance wire connecting the last named ends of the strips, vacuum cups for attaching the sheet to a windshield and common securing elements securing the vacuum cups and conducting strips to the sheet, and providing means for connecting to the conducting strips lead wires from a source of current.

In testimony whereof we hereunto affix our signatures.

WILLIAM A. RUKA.
ALFRED F. HEINEMANN.